United States Patent [19]
Wendling et al.

[11] Patent Number: 6,032,593
[45] Date of Patent: Mar. 7, 2000

[54] GRAIN DRILL OPENER WITH SEPARATE PLACEMENT AND A CONCAVE DISK THEREFOR

[75] Inventors: Ignatz Wendling, Bettendorf, Iowa; Lyle Eugene Stephens, Hampton, Ill.

[73] Assignee: Deere & Company, Moline, Ill.

[21] Appl. No.: 09/067,267

[22] Filed: Apr. 27, 1998

[51] Int. Cl.$^7$ ..................................................... A01C 7/00
[52] U.S. Cl. ........................... 111/187; 111/192; 111/924
[58] Field of Search ..................... 111/187, 188, 111/186, 170, 192, 924, 129; 172/4.5, 17, 22.5, 558, 604

[56] References Cited

U.S. PATENT DOCUMENTS

| | | | |
|---|---|---|---|
| 2,341,795 | 2/1944 | Kriegbaum et al. | 111/187 X |
| 2,611,331 | 9/1952 | O'Neil | 111/73 |
| 2,920,587 | 1/1960 | Shriver | 111/80 |
| 3,362,361 | 1/1968 | Morrison, Jr. | 111/187 X |
| 3,491,709 | 1/1970 | Fleischer et al. | 111/187 X |
| 3,512,489 | 5/1970 | Coldren et al. | 111/187 X |
| 4,275,671 | 6/1981 | Baker | 111/85 |
| 4,760,806 | 8/1988 | Bigbee et al. | 111/87 |
| 4,796,550 | 1/1989 | Van Natta et al. | 111/87 |
| 4,932,340 | 6/1990 | Benzel | 111/187 |
| 5,140,917 | 8/1992 | Swanson | 111/187 |
| 5,595,130 | 1/1997 | Baugher et al. | 111/52 |
| 5,727,638 | 3/1998 | Wodrich et al. | 172/414 |

OTHER PUBLICATIONS

Flexi–Coil Ltd., Barton II Angle Disc Opener Operator's Manual, cover page and p. 2–2, publication date–1996, published in Canada.

Flexi–Coil Ltd., 6000 No–Till Air Drill, two pages printed from the Internet, publication date–1998, publication location—unknown.

*Primary Examiner*—Victor Batson

[57] ABSTRACT

A combination seed and fertilizer opener having separate placement includes a first angled flat disk with a gauge wheel arrangement providing an initial furrow for a first material such as fertilizer. A second opener disk, smaller than the first and concave rather than flat, includes an edge that projects forwardly along the trailing side of the first disk to a forwardmost edge location adjacent the hub of the first disk. The hub of the concave disk is very closely adjacent the trailing edge of the large disk. A tube and boot assembly terminates within the concavity of the second disk near the rear periphery of the first disk. The concave disk forms a seed furrow to receive seed or second material from the tube and boot assembly. The front of the concave disk runs in undisturbed soil but is sufficiently close to the fertilizer furrow to press and cover the fertilizer. The second disk concavity also prevents excessive soil throw. The boot lies within the shadow of the large disk so that the boot does not have to push soil aside but acts primarily to prevent dirt from prematurely filling in the second furrow. A closing wheel is supported from the opener assembly directly behind the large disk and is angled to toward the concavity of the second disk to break soil from the seed furrow wall and close the seed furrow. The concave disk not only provides closing and furrowing functions with limited soil throw but also provides a compact bearing-receiving area. The edge of the concave disk is beveled on the inside of the concavity, opposite that of a conventional concave disk, to reduce forces necessary to form the seed furrow and cover the fertilizer.

29 Claims, 6 Drawing Sheets

GRAIN DRILL OPENER WITH SEPARATE PLACEMENT AND A CONCAVE DISK THEREFOR

BACKGROUND OF THE INVENTION

1. Field of the Invention

The present invention relates generally to controls for agricultural implements and, more specifically, to an opener assembly providing separate placement of two materials such as fertilizer and seed, and an opener disk for such an assembly.

2. Related Art

Opener assemblies such as those on the commercially available John Deere model 750 Grain Drill include a flat disk operating at an angle to the forward direction and a gauge wheel supported closely adjacent the disk for adjusting penetration depth and for cleaning the leading side of the disk. Such an opener assembly is shown in U.S. Pat. No. 4,760,806. A seed tube extends along the trailing side of the disk at least partially in the shadow of the disk to deposit seed in a furrow formed by the opener assembly, and a trailing seed firming wheel establishes good contact between the seed and the ground. In some operations, it is desirable to deposit fertilizer at one level and seed at another level to avoid seed contact with the fertilizer and to optimize nutrient availability for young plants. If fertilizer is placed directly with the seeds, germination damage can occur and use of nitrogen is severely limited. Placing fertilizer beside and below the deposited seed in a single operation reduces the number of passes over the field and can conserve soil moisture. However, maintaining the proper seed bed is a problem since the fertilizer opener tends to disturb soil; this soil disturbance also reduces the moisture-saving advantages of the single pass. To reduce excessive soil disturbance, planting speeds must be reduced. Single elements with dual placement function often fail to operate satisfactorily in certain soil types and conditions and often have heavy draft requirements and less than optimum wear characteristics.

Recently, dual placement systems such as the Flexi-Coil Ltd. Barton™ Double Shoot opener have become available. The Barton™ system includes a first large reverse-angled disk wherein the top of the disk leans toward the trailing side of the disk. The large disk forms a slot for fertilizer. A cleaning wheel runs closely adjacent the large disk. A second oppositely angled disk located a substantial distance behind the large disk forms a new slot in the soil above and to one side of the fertilizer slot for the seed. The Barton™ type of system has several disadvantages including lack of accurate depth control for the trailing disk caused by the large distance between the disk centers. The fore-and-aft dimension of the opener system increases side loads during turns and thereby limits the amount the implement can safely be turned from the forward direction while the openers are operating in the soil. The opener also lacks good separation of materials in certain soil types caused by absence of a device to close the fertilizer trench prior to opening the seed trench. For example in heavy, moist clay conditions the soil fails to fall back into the fertilizer trench. Separation again is a function of the operating speed, with slower speeds being necessary in some conditions to assure separation of seed and fertilizer to prevent germination damage.

Another example of a dual placement opener shown in U.S. Pat. No. 2,920,587 includes a leading flat disk opening a fertilizer furrow and an overlapping trailing flat seed furrow opening disk providing separation of the seed from the fertilizer. A depth control wheel is secured to the leading disk. Such an opener is subject to dirt build-up, depth control is less than optimum, and the trailing disk is upright and does not provide good firming of the soil over the fertilizer. The trailing press wheel running in the seed furrow fails to adequately cover the seed with soil. Lack of an adequate closing systems results in soil erosion problems. The opener is only suitable for tilled soil and would not withstand the rigors of no-till since the forward fertilizer boot or shoe is not in the shadow of the trailing disk for protection. The trailing seed shoe is offset a substantial distance from the protective shadow of the leading disk and is offset at an angle of four to five degrees to the plane of forward travel. The seed shoe has a forward curved edge outside the shadow of the trailing disk. The large offset significantly increases draft forces in untilled soil, and portions of the seed and fertilizer boots create a lot of soil disturbance. In no-till conditions, residue and soil builds up, especially at the curved forward edge of the trailing seed shoe. The trailing seed boot in this and other dual placement openers lies outside the shadow of the disk which not only increases draft but also increases potential for disk and seed boot wear and damage. Bearings extending outwardly from the disk shadow are subject to damage and can catch trash, particularly in narrow row, minimum tillage conditions.

BRIEF SUMMARY OF THE INVENTION

It is therefore an object of the present invention to provide an improved opener for separate placement of two materials, such as seed and fertilizer. It is a further object to provide such an opener which overcomes most or all of the aforementioned disadvantages.

It is a further object of the present invention to provide an improved opener for separate placement of two materials which has better depth control and adjustability than at least most previously available dual placement openers. It is still another object to provide such an opener which has lower draft requirements and better wear characteristics than most previously available dual placement openers and which is particularly well suited to no-till conditions.

It is a further object of the present invention to provide an improved combination seed and fertilizer opener for maintaining separation of the two materials at relatively high speed operation in most types of soils. It is another object to provide such an opener which has a relatively short fore-and-aft dimension for better clearance, reduced side loads during turns in the field and for good depth control for both the seed and the fertilizer.

It is another object to provide an improved combination seed and fertilizer opener having a large leading flat disk for forming a first furrow and a trailing concave disk for forming a shallower second furrow. It is another object to provide such a structure which provides better seed and fertilizer separation, better seed coverage, better component protection and lower draft requirements than most previously available openers.

It is still another object of the present invention to provide an improved combination seed and fertilizer opener assembly wherein a first furrow is opened for one material and a furrow device for the second material positively closes the first furrow with minimal soil throw so that material mixing is prevented. It is still another object to provide such an assembly wherein the furrow device is a concave disk which closes the first furrow as it forms a furrow for the second material, protects the seed boot and provides disk bearing protection while reducing trash build up. It is another object to provide an improved concave disk for such an opener assembly. It is still another object to provide such an opener wherein the concave disk is angled for improved furrow opening and material covering characteristics.

A combination seed and fertilizer opener having separate placement and constructed in accordance with the teachings of the present invention includes a first flat disk with a gauge wheel arrangement similar to that of the John Deere model 750 Grain Drill opener but providing an initial furrow for fertilizer rather than seed. A second opener disk, smaller than the first and concave rather than flat for increased component protection and reduced soil throw, is supported from the area that previously supported the firming wheel on the 750 opener. The second disk is supported at an acute angle to the vertical and is also angled with respect to the fore-and-aft direction.

The edge of the concave disk projects forwardly along the trailing side of the first disk to a forwardmost edge location adjacent the hub of the first disk. The hub of the concave disk is very closely adjacent the trailing edge of the large disk. A seed tube and boot assembly terminates within the concavity of the second disk near the rear periphery of the first disk. The concave disk forms a seed furrow to receive seed from the tube and boot assembly. The front of the concave disk runs in undisturbed soil but is sufficiently close to the fertilizer furrow to press and cover the fertilizer. The seed disk concavity also prevents excessive soil throw. The seed boot lies within the concavity of the disk so that the boot does not have to push soil aside but acts primarily to prevent dirt from filling in the seed furrow before the seed settles into the furrow. A closing wheel is supported from the opener assembly directly behind the large disk and is angled to toward the concavity of the second disk to break soil from the seed furrow wall and close the seed furrow. The concave disk not only provides closing and furrowing functions with limited soil throw and improved soil erosion protection but also provides a bearing hub receiving area which protects the bearing and facilitates trash shedding. The edge of the concave disk is beveled on the inside of the concavity, opposite that of a conventional concave disk, to reduce forces necessary to form the seed furrow and cover the fertilizer.

The opener assembly is relatively narrow as well as compact in the fore-and-aft direction for better implement turning during operation and better soil and trash clearance. Seed and fertilizer coverage and separation are excellent even at high speeds, and the gauge wheel and adjusting structure on the seed tube and boot assembly provide a wide range of adjustments of both seed and fertilizer depth relative to each other as well as to the surface of the ground. The disk structures are longer lasting and provide lower draft forces than at least most previously available dual placement systems. Soil throw is reduced significantly by the trailing concave disk. The convex surface of the second disk working against the soil surface provides a downward component of force to the soil from the leading, descending, half of the blade, then pulls away from the soil on the rear, ascending, half of the blade, reducing the possibility of lifting soil by the rear ascending half of the blade. The tilted axis of the blade also helps to better firm the soil against the first furrow and reduce upward soil throw. The concave blade allows more of the blade support bearing hub to be hidden in the shadow of the blade than possible with a flat blade of the same size mounted at the same angle. The narrow profile of the opener and the protection of the components in the shadows of the disks provide long life, even in the toughest of no-till conditions.

These and other objects, features and advantages of the present invention will become apparent to one skilled in the art upon reading the following detailed description in view of the drawings.

DETAILED DESCRIPTION OF THE DRAWINGS

Figure 1:
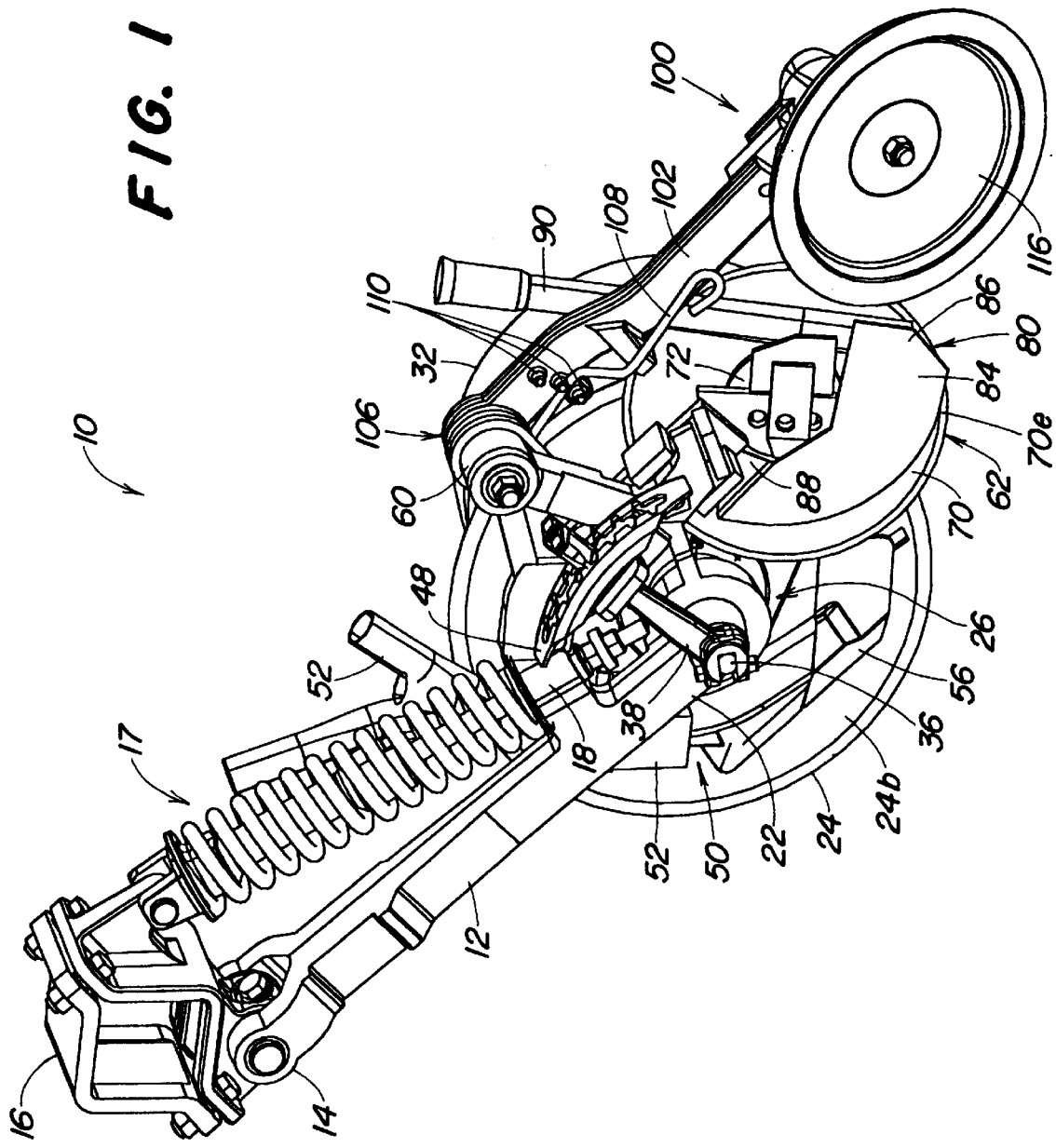
FIG. 1 is a rear perspective view of a separate placement opener.

Referring now to FIGS. 1–6, which are drawn substantially to scale, therein is shown a dual placement opener or opener assembly 10 having a drawbar 12 with a forward connecting end 14 pivotally connected to a bracket 16 fixed to a transversely extending toolbar or frame member (not shown) of a grain drill or similar implement. A down pressure spring assembly 17 is connected between the upper end of the bracket 16 and an apertured spring abutment surface 18 extending upwardly from the lower end of the drawbar 12. The assembly 17 is generally of the type shown and described in U.S. Pat. No. 5,727,638 of common ownership with the present application and incorporated herein by reference.

The drawbar 12 extends downwardly and rearwardly to a lowermost end 22 which rotatably mounts a coulter or flat disk blade 24 on a spindle and hub assembly 26. The disk blade 24 lies generally in a vertical plane and is offset at an acute angle to the forward direction (steer angle) of preferably on the order of seven degrees to define leading and trailing blade surfaces 24a and 24b, respectively. The disk blade 24 is preferably on the order of eighteen inches in diameter. A gauge wheel 32 is mounted for rotation about an axis generally parallel to but offset from the axis of rotation of the disk blade 24 for providing depth control, and for cleaning the surface 24a and preventing soil throw adjacent the surface. A spindle 36 extends through the hub assembly 26 and supports a depth adjusting handle 38 on the boot side of the opener 10. A gauge wheel support arm 42 is connected to the opposite end of the spindle 36 and extends along the leading surface 24a to rotatably mount the gauge wheel 32. A quadrant 48 is supported from the drawbar 12 above the hub assembly 26 and receives the handle 38 which may be raised to move the spindle 36 angularly to adjust the gauge wheel 32 relative to the disk blade 24 and thereby adjust the working depth of the opener 10. When the gauge wheel 32 is in the desired position, the handle 38 is released to again engage the quadrant 48 and maintain the selected gauge wheel position.

A fertilizer boot assembly 50 is connected to the drawbar 12 forwardly of the rotational axis of the disk blade 24. The boot assembly 50 includes a fertilizer tube 52 which extends downwardly close to the forward portion of the hub assembly 26 and angles rearwardly under the hub assembly in the shadow area defined by the trailing surface 24b. A lower fertilizer boot extension 56 projects rearwardly under the hub assembly near the lowermost portion of the disk blade 24 to deposit fertilizer F (FIG. 6a) in the furrow F1.

Figure 2:
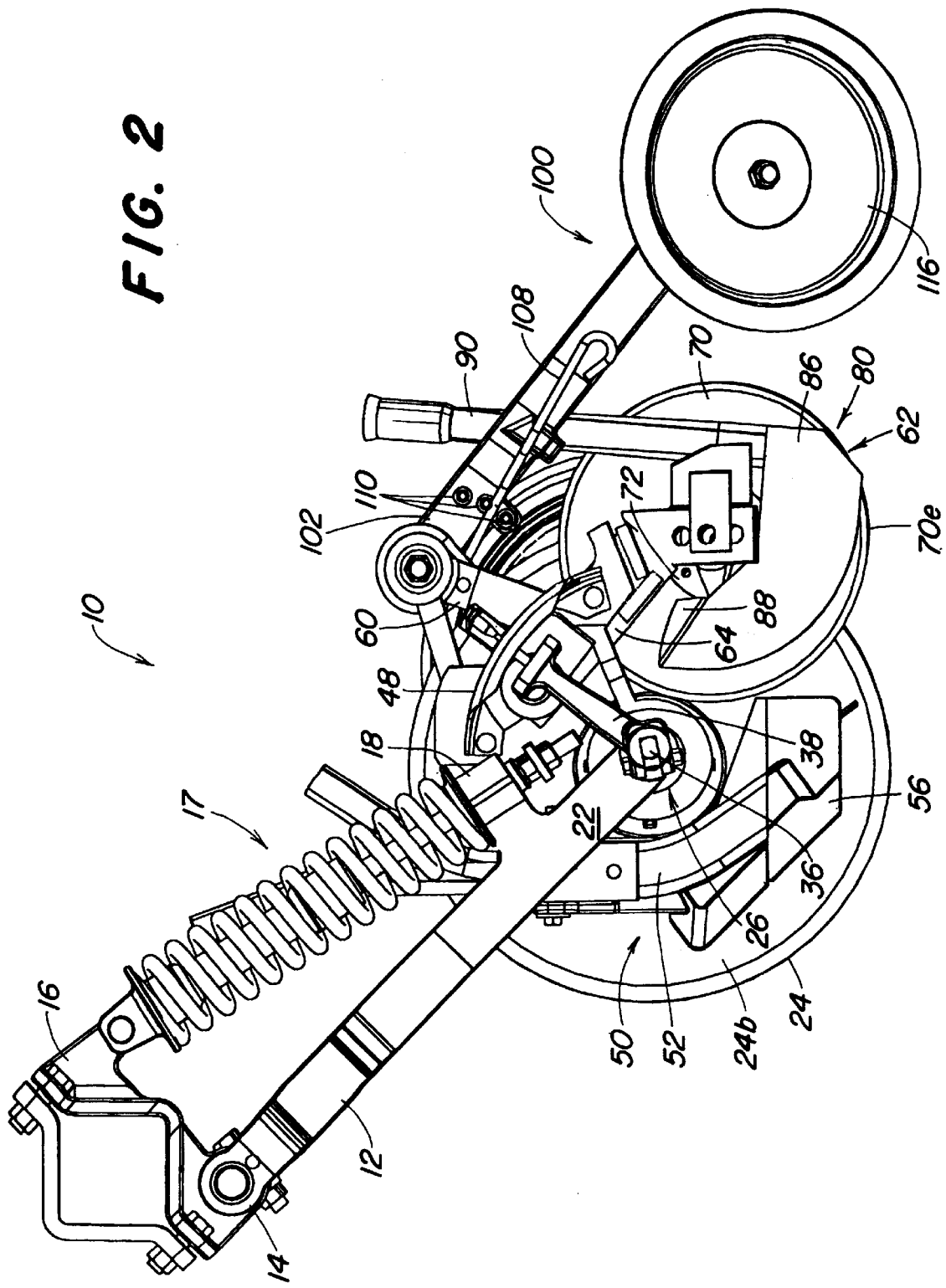
FIG. 2 is a side view of the opener of FIG. 1 taken from the fertilizer and seed boot side of the opener.
Figure 3:
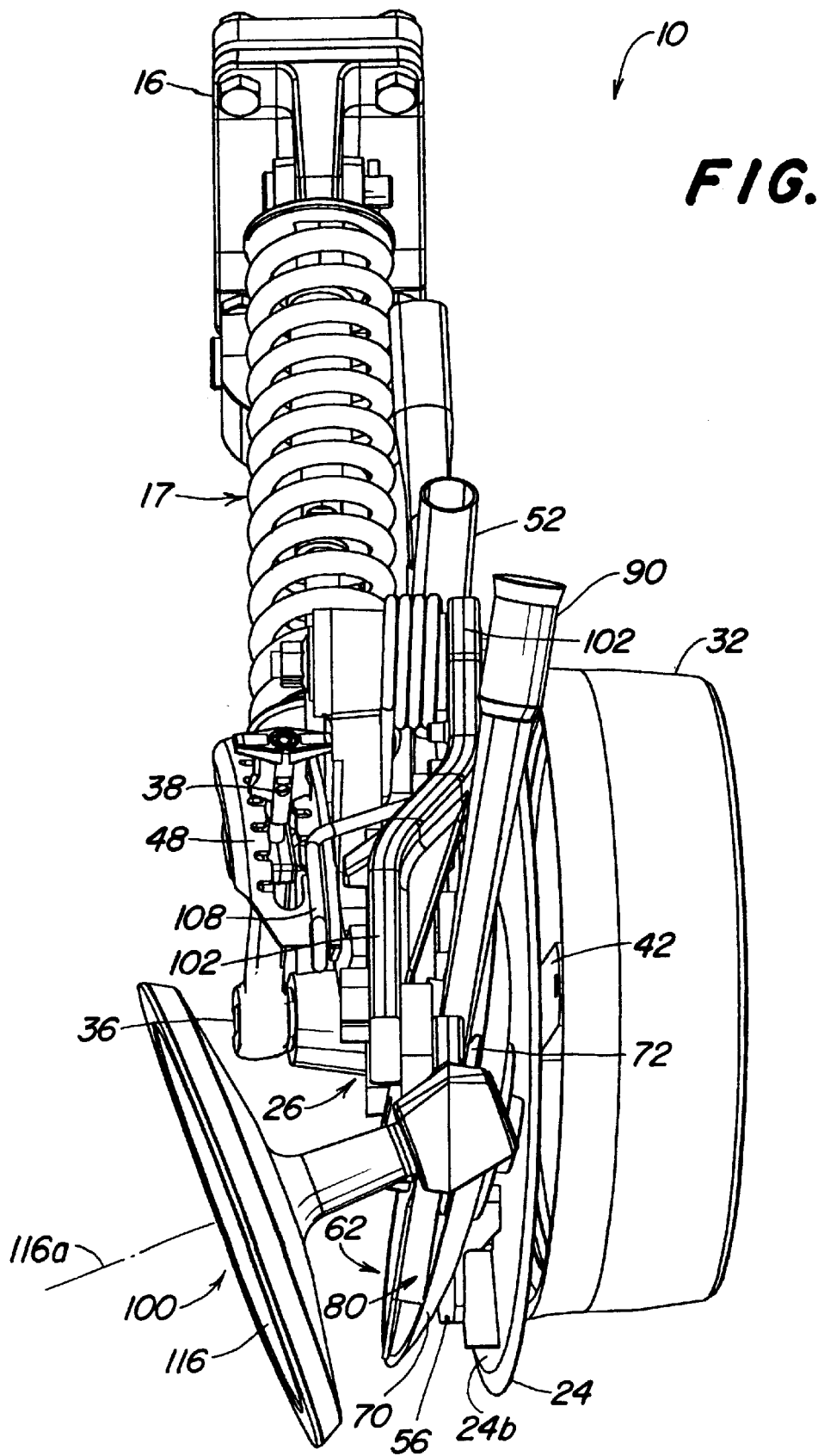
FIG. 3 is a rear view of the opener of FIG. 1.

The drawbar 12 includes an upwardly and rearwardly extending portion 60 supporting a vertically adjustable concave disk opener assembly 62 from a downwardly and rearwardly directed arm 64. The assembly 62 is located directly behind the hub assembly 26 closely adjacent the trailing blade surface 24b and includes a concave disk 70 which opens away from the disk 24 (that is, toward the viewer in FIGS. 1 and 2). The disk 70 is supported by a bearing and hub assembly 72 from the lower end of the arm 64. As best seen in FIGS. 1–3, the bearing and hub assembly 72 is substantially contained within the concavity of the disk 70, and the assembly 72 is also located substantially in the shadow (FIGS. 4–5) of the disk 70 for protection and improved soil and trash flow. The concave disk 70 is preferably on the order of twelve inches in diameter (about ⅔rds of the diameter of the leading disk 24) and is supported at an angle to the forward direction (steer angle) of between three and fifteen degrees and at an angle from a vertical plane (tilt angle) of less than about twenty degrees. A steer angle of seven degrees in the same direction as the steer angle of the leading disk 24 and a tilt angle of twelve degrees has been found to work particularly well in most all conditions. The concavity and tilt angle of the disk 70 advantageously provide good fertilizer furrow closing and firming characteristics in combination with soil lift and throw prevention not heretofore available in most dual opener arrangements. The convex surface of the disk 70 working against the soil surface provides a downward component of force to the soil from the leading, descending half of the disk 70. The surface of the disk 70 pulls away from the rear ascending half of the disk to reduce soil lift and throw. The tilt of the disk 70 from the vertical plane assists this action.

Figure 4:
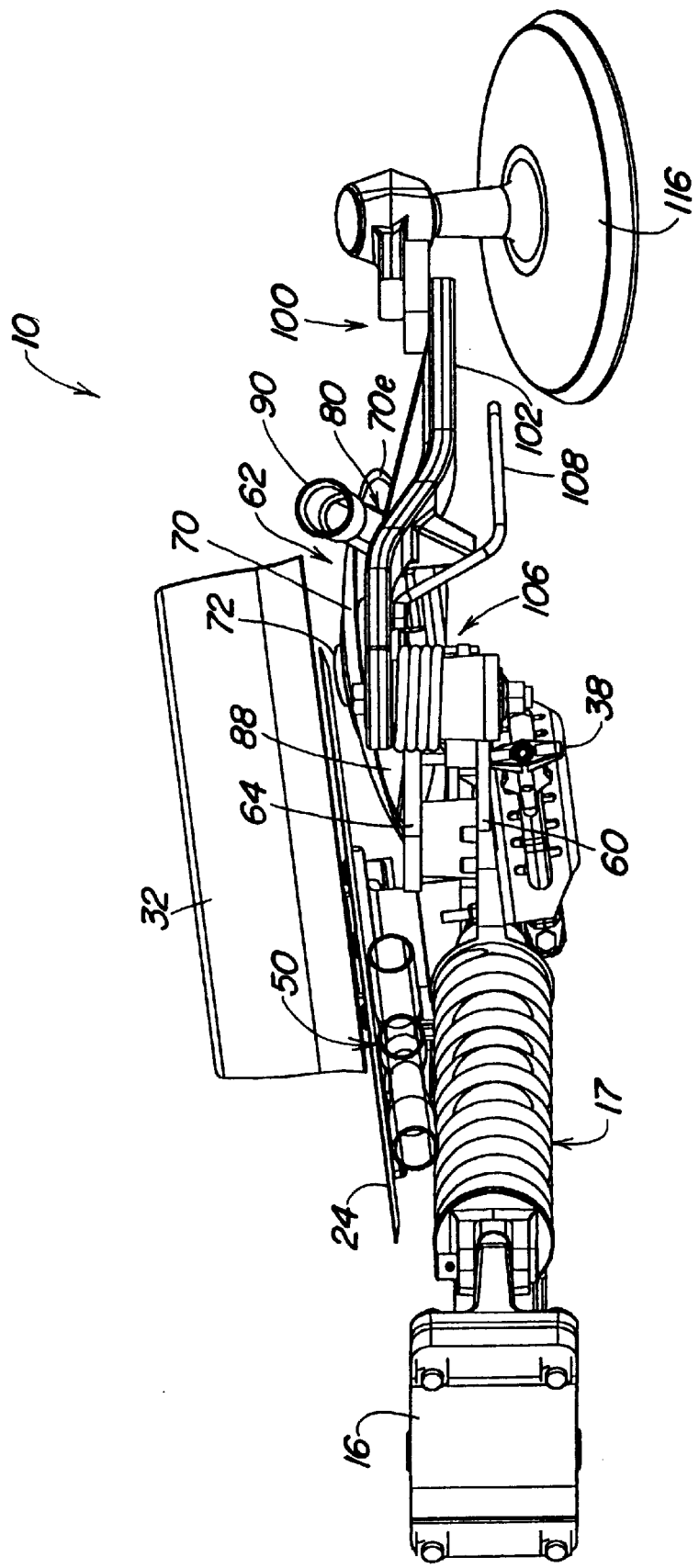
FIG. 4 is a top view of the opener of FIG. 1.
Figure 5:
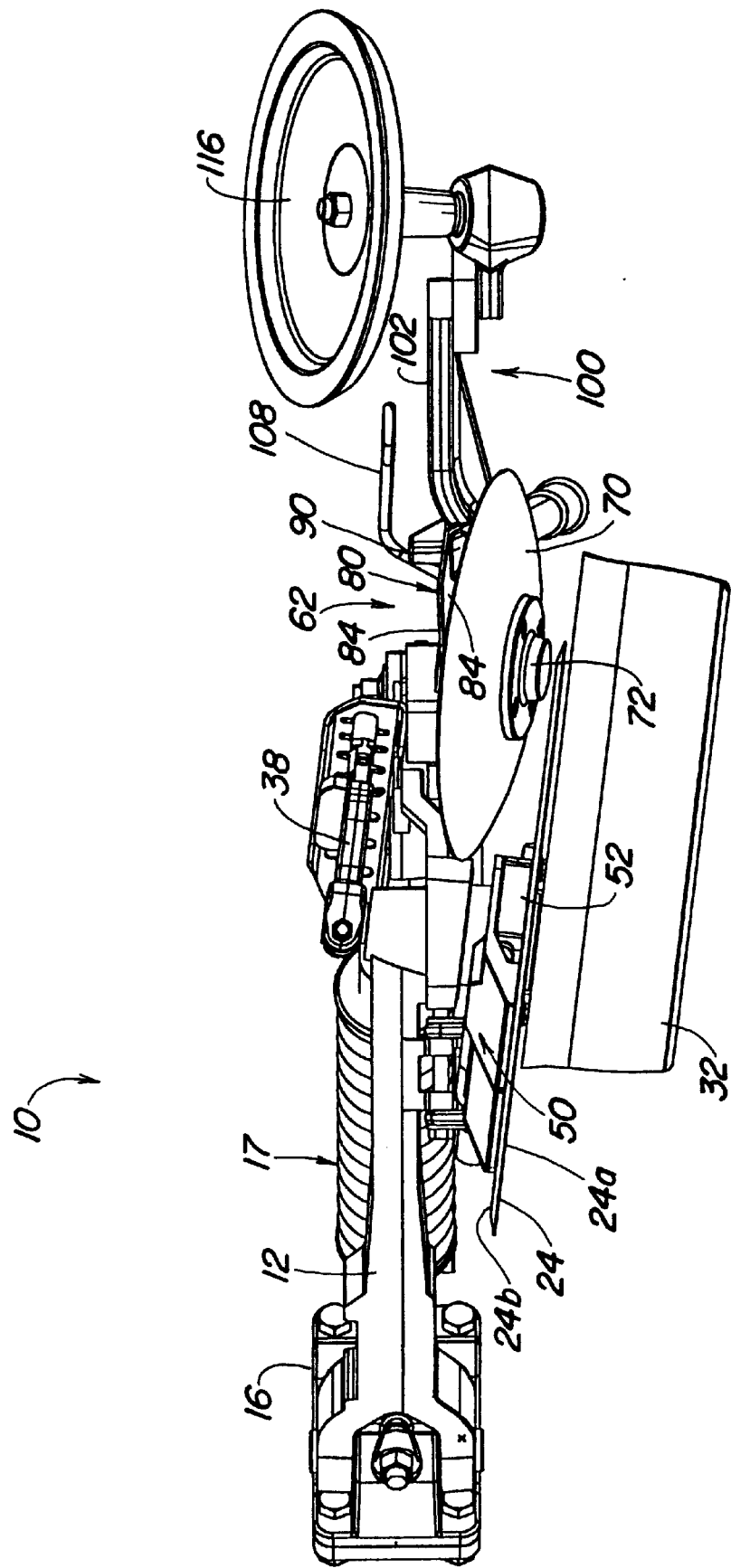
FIG. 5 is a view taken from the bottom of the opener of FIG. 1.

A seed boot assembly 80 is supported from the arm 64 generally within the concavity of the disk 70 and the shadow of the disk 24. The boot assembly 80 includes a runner 84 curving downwardly and rearwardly from the leading edge of the blade 70 in the upper forward quadrant of the blade adjacent the hub assembly 26 to a lower, rearwardmost termination portion 86 adjacent the lower rear quadrant of the disk 70. The runner 84 is planar and lies in the shadow of the disk 70 for good wear characteristics. The runner 84 rides against the sidewall of the newly formed seed furrow to prevent loose soil from falling back into the seed furrow. The seed furrow is formed to one side of and above the fertilizer furrow F1 by the lower, forward edge of the disk 70 which runs slightly in virgin soil (FIG. 6b) near the bottom of the lower forward quadrant of the disk 70 just outside the shadow of the disk 24. Soil C1 (FIG. 6b) is pushed over the first furrow F1 to cover the first material F. As best seen in FIGS. 1, 2 and 4, the edge of the disk (70e) is beveled on the inside concavity of the disk, opposite the side normally beveled on concave disks, to better penetrate the ground when forming a seed furrow in virgin soil adjacent the aft portion of the disk 24. A scraper 88 is fixed to the upper forward portion of the runner 84 to maintain the inside of the disk 70 free from excessive dirt build-up.

Figure 6C:
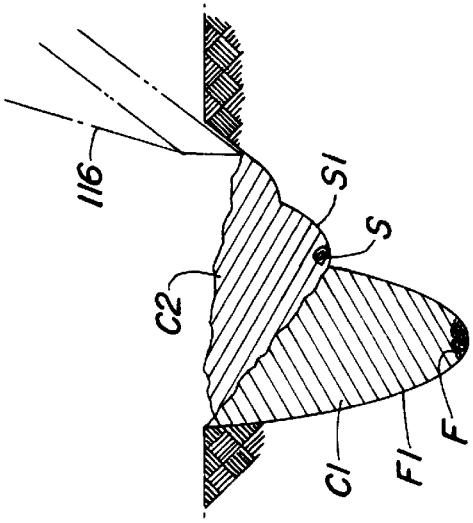
FIGS. 6a–6c show soil profiles of the fertilizer and seed furrows formed during operation of the opener.
Figure 6B:
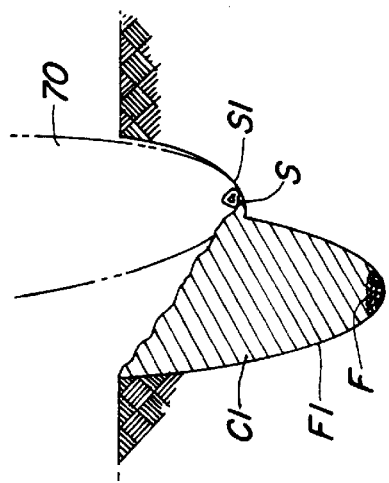
Figure 6A:
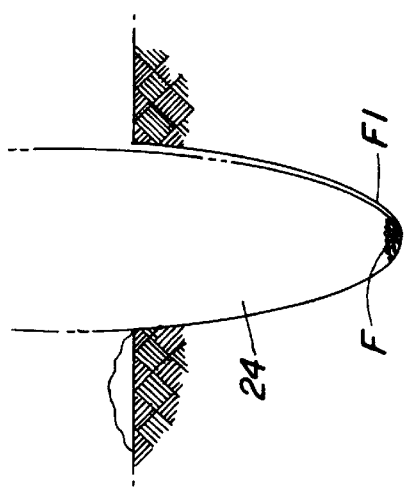

An upright seed tube 90 extends substantially vertically from a connection with a source of seeds to be planted (not shown) to a lowermost end between the portion 86 and the lower rear quadrant of the disk 70. The straight seed path from the source provides good seed placement and depth control characteristics. The lower end of the seed tube 90 opens downwardly adjacent the aft portion 86 of the planar runner 84 and the lower rear quadrant of the concave disk 70 above and to one side of the fertilizer furrow F (FIG. 6b). The fertilizer furrow F1 is thoroughly closed by the action of the angled and tilted concave disk 70 to prevent contact of the seed S with the fertilizer F deposited by the fertilizer boot assembly 50.

A furrow closing assembly 100 is supported behind the disk 70 by the lower aft end of an arm 102 having an upper forward end pivotally connected to the portion 60 of the drawbar 12. A down pressure spring assembly 106 having an adjusting handle 108 selectively received at indexing locations 110 on the arm 102 provides adjustable down force on the assembly. A closing wheel 116 is supported from the aft end of the arm 102 for rotation about an axis 116a (FIG. 3) angled downwardly in the direction of concavity of the disk 70. The closing wheel 116 is offset on the concave disk side of the assembly (FIGS. 3–5) to break soil C2 from the side of the seed furrow S1 (FIG. 6c) and completely cover the seed S and close the furrow. The covering and filling action provided by the closing wheel 116 provides a good soil surface profile to protect against erosion.

Having described the preferred embodiment, it will become apparent that various modifications can be made without departing from the scope of the invention as defined in the accompanying claims.

We claim:

1. A minimum tillage disk opener assembly for depositing two materials in furrows in the soil in a single pass operation as the opener moves in a forward direction over the ground, the disk opener assembly including a drawbar, a first angled disk having a leading surface and a trailing surface and defining a shadow area rearwardly of the trailing surface, the first angled disk forming a first furrow in the soil, and tube structure for depositing a first material in the first furrow; a second disk supported from the drawbar and having a forward extremity overlapping the first angled disk, the second disk having a substantial furrow opening portion lying in the shadow area of the first disk and forming a second furrow in the soil for receiving a second material and covering the first furrow as the second furrow is formed, the furrow opening portion extending laterally into one of the sides of the first furrow so the first and second furrows have substantial overlapping portions when viewed in the forward direction, and boot structure depositing the second material in the second furrow at a location offset from the deposited first material, wherein the covering of the first furrow prevents contact between the first and the second materials.

2. The disk opener assembly as set forth in claim 1 further including a gauge wheel adjustably supported adjacent the leading surface of the first angled disk.

3. The disk opener assembly as set forth in claim 1 wherein the first and second disks include first and second hubs, respectively, wherein the second disk has a leading edge terminating closely adjacent the first hub at the trailing surface of the first disk.

4. The disk opener assembly as set forth in claim 1 further comprising a closing wheel trailing the second disk for breaking a side of the second furrow and covering the second material.

5. The disk opener assembly as set forth in claim 1 wherein the second disk includes a beveled edge having a bevel extending to the inside of the concavity.

6. A minimum tillage disk opener assembly for depositing two materials in furrows in the soil in a single pass operation as the opener moves in a forward direction over the ground, the disk opener assembly including a drawbar, a first angled disk having a leading surface and a trailing surface and defining a shadow area rearwardly of the trailing surface, the first angled disk forming a first furrow in the soil, and tube structure for depositing a first material in the first furrow; a second disk supported from the drawbar and overlapping the first angled disk in the forward direction, the second disk having a furrow opening portion lying in the shadow area of the first disk and forming a second furrow in the soil for receiving a second material and covering the first furrow as the second furrow is formed, and boot structure depositing the second material in the second furrow at a location offset from the deposited first material, wherein the covering of the first furrow prevents contact between the first and the second materials; and wherein the second disk is concave and defines a disk concavity.

7. The disk opener assembly as set forth in claim 6 wherein the boot structure lies within the concavity of the second disk.

8. The disk opener assembly as set forth in claim 6 wherein the boot structure includes a planar runner lying substantially within the concavity of the second disk.

9. A minimum tillage disk opener assembly for depositing two materials in furrows in the soil in a single pass operation as the opener moves in a forward direction over the ground, the disk opener assembly including a drawbar, a first angled disk having a leading surface and a trailing surface and defining a shadow area rearwardly of the trailing surface, the first angled disk forming a first furrow in the soil, and tube structure for depositing a first material in the first furrow, a second disk supported from the drawbar and overlapping the first angled disk in the forward direction, the second disk having a furrow opening portion lying in the shadow area of the first disk and forming a second furrow in the soil for receiving a second material and covering the first furrow as the second furrow is formed, and boot structure depositing the second material in the second furrow at a location offset from the deposited first material, wherein the covering of the first furrow prevents contact between the first and the second materials; and wherein the second disk has a convex side supported adjacent the tube structure, and a concave side opening away from the first angled disk.

10. The disk opener assembly as set forth in claim 9 wherein the boot structure is supported generally within the concave side in the shadow area defined by the first angled disk so that the boot structure operates primarily in soil previously disturbed by the first and second disks to thereby limit side forces on the boot structure.

11. The disk opener assembly as set forth in claim 9 wherein the convex side of the second disk urges soil over the first material as the second furrow is formed.

12. The opener assembly as set forth in claim 9 wherein the second disk overlaps the first disk and the boot structure is located adjacent the first angled disk and scrapes dirt from the second disk.

13. The opener assembly as set forth in claim 12 further including a guage wheel supported adjacent the first angled first and second disk and providing adjustable depth control for the disks.

14. The opener assembly as set forth in claim 13 wherein the first angled disk includes a hub and the guage wheel includes a guage wheel adjustment extending through the hub.

15. A disk opener assembly for depositing material in the soil as the opener moves in a forward direction over the ground, the disk opener assembly including a drawbar, a first angled disk forming a first furrow in the soil, the first angled disk defining leading and trailing disk surfaces and a protective shadow area behind the trailing surface, tube structure for depositing a first material in the first furrow; a second disk supported from the drawbar, the second disk having a furrow forming portion lying partially in the shadow area and forming a second furrow in the soil for receiving a second material, the second disk covering the first furrow as the second furrow is formed, and boot structure depositing the second material in the second furrow, wherein the second disk is concave and includes an outermost edge having a bevel extending to the inside of the concavity.

16. The disk opener assembly as set forth in claim 15 wherein the boot structure lies at least partially in the shadow area.

17. The opener assembly set forth in claim 15 wherein the second disk is angled from the forward direction at an angle lying in a range of 3 to 15 degrees.

18. The opener assembly as set forth in claim 15 wherein the second disk is tilted from the vertical plane at an angle of less than 20 degrees to help firm the first furrow.

19. A disk opener assembly for depositing material in the soil as the opener moves in a forward direction over the ground, the disk opener assembly including a drawbar, a first angled disk forming a first furrow in the soil, the first angled disk defining leading and trailing disk surfaces and a protective shadow area behind the trailing surface, tube structure for depositing a first material in the first furrow; a second disk supported from the drawbar, the second disk having a furrow forming portion lying partially in the shadow area and forming a second furrow in the soil for receiving a second material, the second disk covering the first furrow as the second furrow is formed, boot structure depositing the second material in the second furrow, and wherein the second disk is concave opening away from the trailing disk surface, overlaps the first angled disk, and has a leading edge, and wherein the leading edge of the second disk lies in the shadow area of the first angled disk.

20. The opener assembly as set forth in claim 19 wherein the second disk is angled from the forward direction at an angle in the range of from 3 to 15 degrees.

21. The opener assembly as set forth in claim 20 wherein the second disk is angled from a vertical plane at a tilt angle of approximately 12 degrees.

22. The opener assembly as set forth in claim 19 further including an angled closing wheel trailing the second disk and angled toward the concavity of the second disk to break soil from a wall of the second furrow and close the second furrow.

23. A dual placement opener assembly for depositing first and second materials in the soil as the opener assembly moves in a forward direction over the ground, the opener assembly including a drawbar, a first furrow forming device forming a first furrow in the soil, tube structure for depositing the first material in the first furrow, a trailing disk supported from the drawbar, the trailing disk having a leading edge portion forming a second furrow in the soil offset above and to one side of the first furrow for receiving the second material, the trailing disk covering the first furrow as the second furrow is formed, and boot structure depositing the second material in the second furrow, wherein the trailing disk is concave and the boot structure lies substantially within the concavity of the trailing disk.

24. The opener assembly as set forth in claim 23 wherein the first furrow forming device includes a leading disk angled from the forward direction to define a protective shadow area and the trailing disk overlaps the leading disk and lies at least partially within the protective shadow.

25. The opener assembly as set forth in claim 24 wherein the trailing disk and the leading disk are angled in the same direction from the forward direction to define disk steer angles, the disk steer angles being in a range of from three to fifteen degrees.

26. The opener assembly as set forth in claim 23 wherein the trailing disk is angled from a vertical plane to reduce soil throw and enhance covering of the first furrow.

27. The opener assembly as set forth in claim 23 wherein the boot structure includes a planar runner preventing soil from the first furrow from entering the second furrow prior to the depositing of the second material in the second furrow, the planar runner extending generally from a forward end located adjacent an upper forward quadrant of the tailing disk to the lower rearward quadrant of the trailing disk, the forward end indluding a scraper for removing soil from the inside concavity of the trailing disk, and wherein the planar runner lies within the concavity of the trailing disk for protection and increased wear life.

28. A disk opener assembly for depositing material in the soil as the opener moves in a forward direction over the ground, the disk opener assembly including a drawbar, a first angled disk forming a first furrow in the soil, the first angled disk defining leading and trailing disk surfaces and a protective shadow area behind the trailing surface, tube structure for depositing a first material in the first furrow; a second disk supported from the drawbar, the second disk having a furrow forming portion lying partially in the shadow area and forming a second furrow in the soil for receiving a second material, the second disk covering the first furrow as the second furrow is formed, and boot structure depositing the second material in the second furrow, wherein the boot structure lies at least partially in the shadow area, and wherein the second disk is concave, and the boot structure includes a planar runner portion lying substantially within the concavity of the second disk.

29. A disk opener assembly for depositing material in the soil as the opener moves in a forward direction over the ground, the disk opener assembly including a drawbar, a first angled disk forming a first furrow in the soil, the first angled disk defining leading and trailing disk surfaces and a protective shadow area behind the trailing surface, tube structure for depositing a first material in the first furrow; a second disk supported from the drawbar, the second disk having a furrow forming portion lying partially in the shadow area and forming a second furrow in the soil for receiving a second material, the second disk covering the first furrow as the second furrow is formed, and boot structure depositing the second material in the second furrow, and wherein the first angled disk is flat, the second disk is concave and has a concave side opening away from the first angled disk, the concave side urging soil against the first material as the second furrow is being formed, thereby positively providing separation of the first material from the second material.

* * * * *